United States Patent [19]

Feuerherm

[11] 4,382,766
[45] May 10, 1983

[54] APPARATUS FOR CONTROLLING WALL THICKNESS IN EXTRUDED TUBULAR SYNTHETIC RESIN BLANK

[76] Inventor: Harald Feuerherm, Alfred-Delp-Str. 1, 5210 Troisdorf, Fed. Rep. of Germany

[21] Appl. No.: 285,138

[22] Filed: Jul. 20, 1981

Related U.S. Application Data

[60] Division of Ser. No. 90,442, Nov. 1, 1979, Pat. No. 4,279,857, which is a continuation of Ser. No. 854,748, Nov. 25, 1977, abandoned.

[30] Foreign Application Priority Data

Nov. 27, 1976 [DE] Fed. Rep. of Germany ....... 2654001

[51] Int. Cl.³ .............................................. B29D 23/04
[52] U.S. Cl. .................................. 425/465; 264/541; 264/209.1; 425/376 A; 425/381; 425/466
[58] Field of Search ............... 425/466, 465, 381, 380, 425/192 R, 467, 376 A; 264/541, 540, 167

[56] References Cited

U.S. PATENT DOCUMENTS

| | | | |
|---|---|---|---|
| 3,114,932 | 12/1963 | Donnelly | 264/541 |
| 3,217,360 | 11/1965 | Mason et al. | 264/541 |
| 3,221,371 | 12/1965 | Stevens | 264/541 |
| 3,309,443 | 3/1967 | Scott, Jr. et al. | 264/541 |
| 3,339,235 | 9/1967 | Nossol | 425/466 |
| 3,345,690 | 10/1967 | Hagen | 264/540 |
| 3,390,430 | 7/1968 | Lynch et al. | 425/381 |
| 3,440,310 | 4/1969 | Makowski | 264/167 |
| 3,453,690 | 7/1969 | Mayner | 425/381 |
| 3,535,739 | 10/1970 | Mehnert | 425/381 |
| 3,611,494 | 10/1971 | Feuerherm | 425/380 |
| 3,801,254 | 4/1974 | Godtner | 425/380 |
| 3,860,372 | 1/1975 | Newman, Jr. | 425/466 |
| 3,981,672 | 9/1976 | Wilson | 425/380 |
| 4,171,195 | 10/1979 | Klein et al. | 425/467 |

FOREIGN PATENT DOCUMENTS

1948580 4/1970 Fed. Rep. of Germany ...... 425/381

*Primary Examiner*—Jeffery R. Thurlow
*Attorney, Agent, or Firm*—Michael J. Striker

[57] ABSTRACT

A mold has a core surrounded by an outer sleeve which defines with the core an annular axially extending passage. An adjustment element in the form of a ring or sleeve is displaceable in this passage so as to vary the radial dimension of a tubular blank that is extruded from the outlet end of the passage. The adjustment ring or sleeve may be elastically deformable by means of hydraulic cylinders or screws so as to create the desired thickness at the desired location, and may even be displaced during operation of the apparatus so as to vary the thickness of the blank from one region to another in the direction in which it is extruded.

10 Claims, 25 Drawing Figures

APPARATUS FOR CONTROLLING WALL THICKNESS IN EXTRUDED TUBULAR SYNTHETIC RESIN BLANK

This is a division of application Ser. No. 90,442, filed Nov. 1, 1979, now U.S. Pat. No. 4,279,857, issued July 21, 1981, which is a continuation application of application Ser. No. 854,748, filed Nov. 25, 1977, now abandoned.

BACKGROUND OF THE INVENTION

The present invention relates to a method of and an apparatus for controlling the wall thickness in an extruded synthetic-resin blank. More particularly this invention concerns the production of such a blank which is thereafter to be blow molded into a container such as a bottle.

In the production of hollow bodies such as containers, tubes, foils, and the like it is standard practice to transform a solid and plastic synthetic-resin strand first into a tubular and plastic synthetic-resin strand. Thereafter this tubular strand is formed in a mold or similar equipment into the desired article.

It is almost always necessary that the desired article have a uniform wall thickness, that is that it be of substantially the same wall thickness throughout.

Typically the solid strand is fed to a shaping nozzle having a central mandrel which transforms the solid strand into a tubular strand that passes through an annular passage which may contain several large-volume compartments to an annular outlet. Pistons may be provided in these compartments or the synthetic-resin material may simply be forced through the passage continuously so that a tubular synthetic-resin blank issues from the annular outlet of the shaping nozzle. The pin or mandrel that transforms the solid strand into a tubular strand is typically constituted as the core or central part of the nozzle and is supported on the outer part of the nozzle by means of struts or webs. These last-mentioned struts or webs must inherently extend radially through the passage along which the synthetic-resin material flows so that the flow must pass around these struts or webs. After flowing around such formations the material reunites. To this end the core may be made of oppositely tapered shape so as to maintain a uniform flow cross-section throughout the passage. It is also possible to angularly offset axially spaced struts or webs in order to minimize the interruption of flow for the tubular strand.

It has also been suggested in arrangements wherein the solid strand is introduced radially into the shaping nozzle to subdivide this strand into a pair of branches which each are eventually fed at the outlet side of the nozzle to a respective semi-cylindrical passage. To this end the distribution chamber inside the shaping nozzle is heart-shaped and the points of such heart-shaped chambers overlap each other. Various other formations are used to insure uniform flow and it is also known to profile the core of such a mold. Such arrangements can be seen in U.S. Pat. Nos. 3,114,932; 3,217,360 and 3,309,443 whose entire disclosures are herewith incorporated by reference.

Further known arrangements can be seen in Canadian Pat. No. 788,896, French Pat. No. 1,279,158, German Pat. Nos. 1,236,173 and 1,704,850 as well as in German Utility Model No. 1,984,772.

All such arrangements have nonetheless shown themselves not able to produce finish products after blow molding having the exactly required wall thicknesses. In particular in the production of bottles or the like of synthetic-resin material the desired thickness at and adjacent the base and neck of the bottle is almost impossible to obtain with the known methods. Furthermore when the composition of the material being molded changes it is normally necessary to replace the entire nozzle assembly in order to insure proper molding of the new material.

Furthermore due to the flow characteristics of the synthetic-resin material it is frequently necessary to decenter the core of the mold. The result of this is that the plastic synthetic-resin material flows most rapidly in those regions where it is the hottest or where the pressure drop is the greatest. It is necessary to reduce the mold gap or passage width at exactly this location in order to obtain uniform flow throughout the shaping nozzle. When this is done the blank produced by such a mold is of irregular thickness and hottest in the thinnest region, so that it becomes very difficult to form many types of articles with such a blank. When such a virtually randomly irregular blank is used to produce a container or the like the uncontrollable irregularities in the blank are often multiplied during the blow molding.

SUMMARY OF THE INVENTION

It is therefore an object of the present invention to provide an improved method of and apparatus for making a tubular synthetic-resin blank.

Another object is the provision of an improved method and apparatus for making such a blank which is ideally suited for blow molding and wherein it is possible to obtain the exactly desired wall thickness at any location in the finished blow-molded article.

These objects are attained according to the present invention in a method and apparatus which take into account not only the fact that certain regions are stretched more than other regions in the blow molding, but that certain regions are more stretchable than others. Thus according to this invention the high-stretch regions of the tubular strand produced from the solid strand are given a relatively large thickness and the low-stretch regions are given a relatively small thickness. It is noted in this context that the high-stretch regions include those regions where the flow was interrupted so that the tubular blank is particularly susceptible to stretching.

It is also a feature of the instant invention to vary the thickness of the workpiece along the tubular blank, in particular in the areas that will eventually be made into the neck and bottom of a container. This is achieved by changing the cross-sectional shape and/or radial dimension of the annular passage as the material is being extruded through it.

The high-stretch and low-stretch regions of the tubular strand and given their respective thicknesses in accordance with this invention in two separate stages. In one stage, preferably at an upstream location, a continuous welt and continuous thinned regions are formed. At a downstream location a variable formation is used in the shaping nozzle for forming axially or longitudinally offset thickened and thinned regions.

According to further features of this invention the shaping nozzle has a core member which defines an axis that corresponds to the direction or path along which the material is extruded. An outer member defines with this core member an annular passage having an annular outlet at the axial end, normally lower, surface of the shaping nozzle. The passage defined between the core and outer members is of generally uniform radial dimension measured at any plane perpendicular to the axis, the radial dimension being, of course, variable in the axial direction. Inlet means is provided in the shaping nozzle for transforming the solid strand coming from an extruder or the like in an axial or radial direction into a tubular strand. Finally an adjustment element is provided in the passage between the members so as to define therein a region of variable radial dimension which is different from the predetermined radial dimension of the passage. Means is associated with this adjustment element for displacing it relative to the members and thereby changing the variable dimension. The core member may be mounted within the outer member in the manner shown in my copending application Ser. No. 804,378 filed June 7, 1977, now U.S. Pat. No. 4,120,633, the entire disclosure of which is herewith incorporated by reference.

The adjustment element may be a highly elastic ring or collar that is axially displaceable or radially deformable. Alternately it is possible for the adjustment element to be a rigid member which is eccentrically or axially displaceable and has a shape corresponding to that of the desired tubular blank.

In accordance with the instant invention it is possible to use a pair of axially elongated elastic rings flanking the passage at the outlet end. The one ring is displaced by means of screws or the like into the desired position and the other ring may be periodically deflected so as to obtain the desired thickness and thinness along the workpiece as it is extruded.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
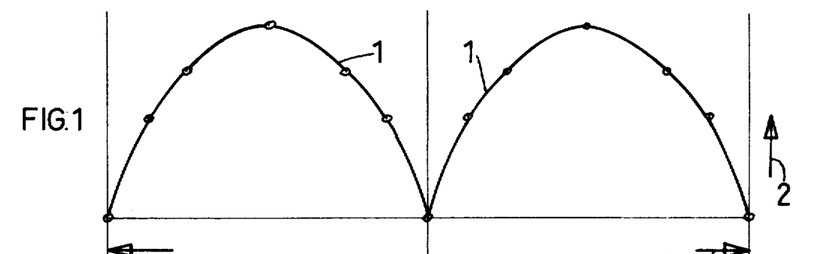
FIG. 1 is a diagram illustrating the stretching to which a tubular blank is normally subjected.

FIG. 1 shows a curve 1 basically formed as a pair of adjacent halves of a sine wave which represent the elongation to which a tubular blank is shown with the ordinate direction 2 indicating the amount of stretch and the abscissa direction 3 indicating the area along the circumference of a complete tubular blank. Typically the bottom of such a blank is pinched together along a plane perpendicular to its path of displacement and thereafter the blank is inflated. Most stretch occurs at those regions in the sides at the base of the blank 90° offset from the plane along which the mold closes and where the blank is pinched together.

Figure 2:
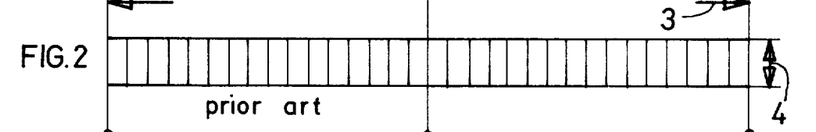
FIGS. 2 and 3 are diagrams illustrating the prior-art systems.
Figure 3:
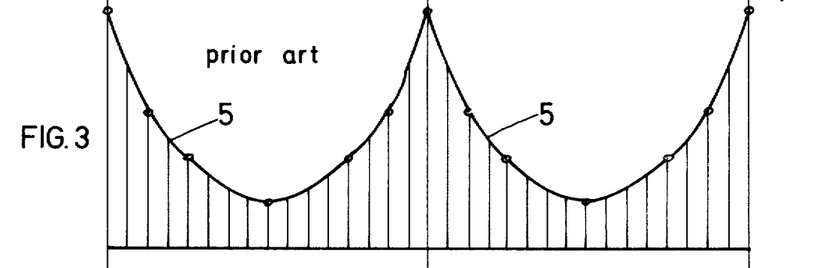

In the prior art as shown in FIG. 2 the blank prior to such deformation has a regular thickness shown at 4 so that when stretched as shown in FIG. 1 the finished product has as shown in FIG. 3 a thickness indicated by the curve 5 which shows that at the regions of most stretching the article is the thinnest and at the region of least stretching the article is thickest.

Figure 4:
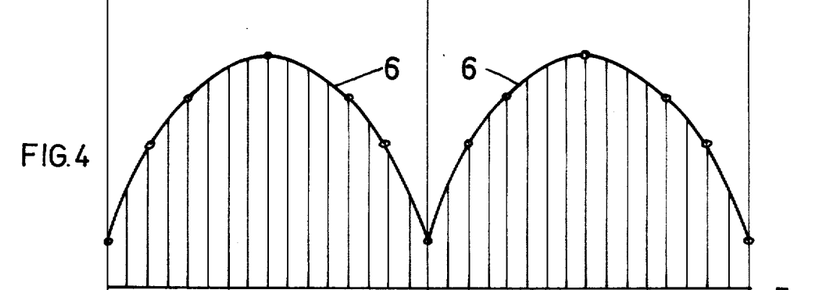
FIGS. 4 and 5 are diagrams illustrating the system according to the instant invention.
Figure 5:
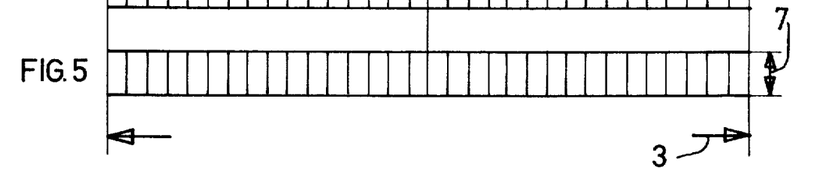

According to this invention the workpiece is formed as shown by curve 6 of FIG. 4 so as to be much thicker at those regions to be subjected to the most stretching or which are most stretchable. The result, after stretching as shown in FIG. 1, is a workpiece as shown in FIG. 5 having a uniform thickness 7. This thickness 7 corresponds to the minimum thickness of the tubular blank at the region where it is subject to the least stretching, that is the two edges lying directly on the plane at which the sides of the blank are pinched together.

Figure 6:
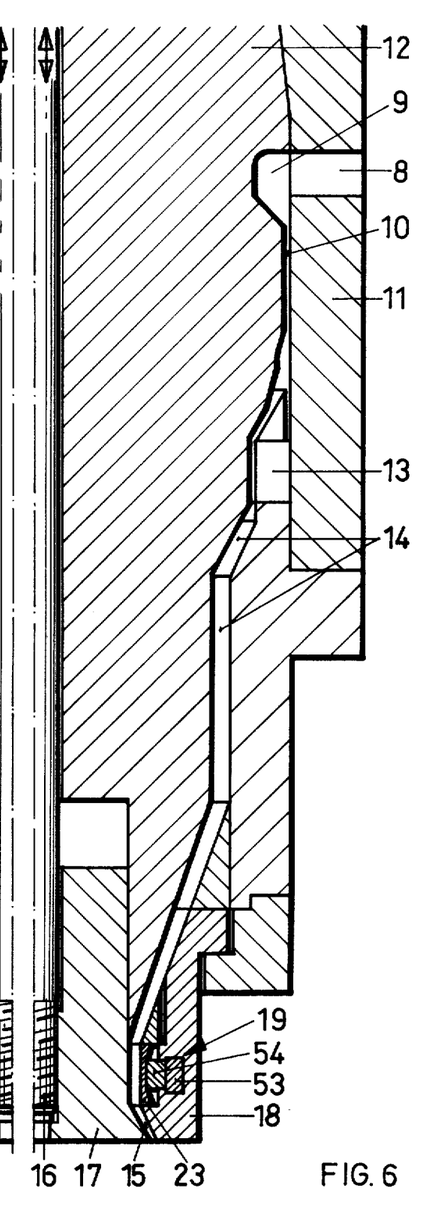
FIG. 6 is an axial section through a portion of a nozzle according to this invention.
Figure 21:
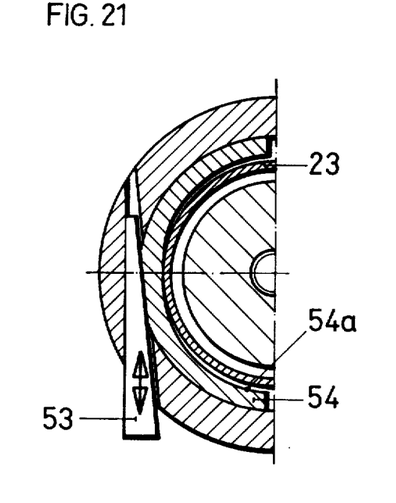
FIG. 21 is a horizontal section taken along line XXI—XXI of FIG. 6.

A first embodiment of a shaping nozzle according to the instant invention is shown in FIGS. 6 and 21. This nozzle has a core member 12 surrounded by an outer twopart sleeve member 11 which defines with the core member 12 an annular passage 10 starting at its upper end at a distribution chamber 9 adjacent a radial inlet 8 and extending past an adjustable section-changing mechanism 13 which is described below. At its lower region the passage 10 becomes a passage 14 which terminates at an outwardly flared outlet portion 15 defined by an outwardly and downwardly flared central pin or mandrel 17 which is axially displaceable on a rod 16 for adjustment of its radial dimension.

An outer fixed ring 18 is associated with an inner highly elastic ring 19 constituting an adjustment element. This ring 19 may be formed of semi-circular shape as shown at 54 in FIG. 21 and have an inner surface 54a which defines a crescent-shaped compartment with an inner sleeve 23. A wedge 53 is engageable between the element 43 and the outer sleeve member 11. Tangential displacement of this wedge 53 can therefore determine the shape of the passage 14 at the respective segment thereof.

Figure 7:
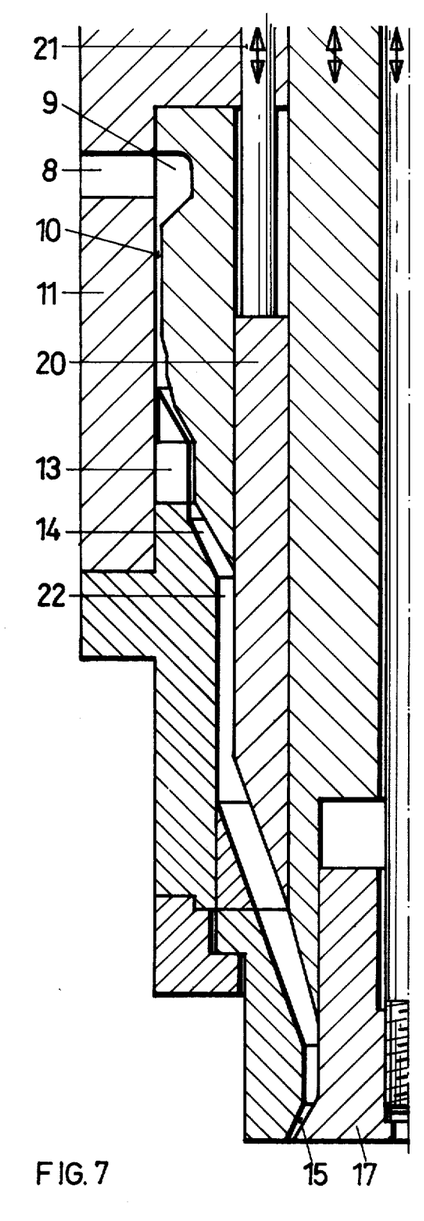
FIG. 7 is an axial section through a second embodiment of the nozzle according to this invention.

FIG. 7 shows an arrangement similar to FIG. 6, but wherein an axially displaceable piston 20 carried on a piston rod 21 defines a passage portion 23 of variable size. Reciprocation of this piston 20 allows a portion of material in the passage or compartment 22 to be pumped therefrom.

Figure 8:
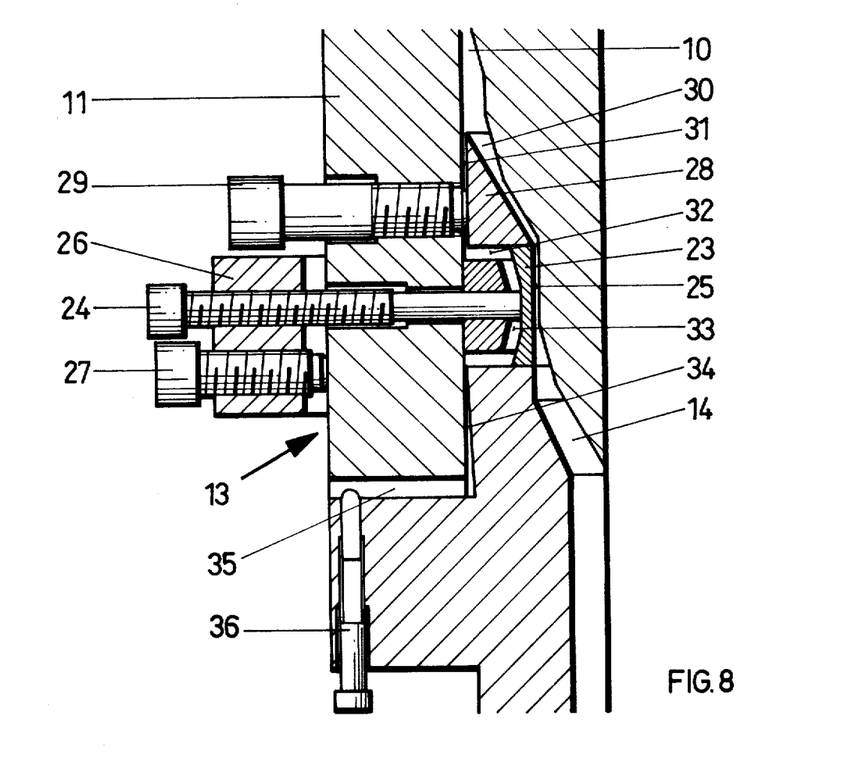
FIG. 8 is a large-scale sectional view through a third arrangement according to this invention.

FIG. 8 shows an adjustment mechanism 13 which employs a highly elastic ring 23 having a cylindrical inner surface that defines a passage portion 25. Screws 24 engage radially inwardly against the outer periphery of the elastic ring 23 and are threaded into a holder ring 26 positioned by means of screws 27 on the outer member 11. Another highly elastic ring 28 of triangular section is provided above the ring 25 and rests thereon. This ring 28 defines an inner passage 30 that is a continuation of the passage 10 and of the passage 25 and an outer passage 31 that opens into a chamber 32 above and a chamber 33 behind the ring 23. Screws 29 serve to radially position the ring 28. Furthermore the lower end of the chamber 33 is connected via a bleed or branch passage or conduit 34 to a radially extending branch conduit or passage 35 which is provided with a screw 36 that can act as a valve or flow controller in this passage 35. Thus during operation when the passage 10 is pressurized with molten synthetic-resin plastic material this material will pressurize chambers to both sides of both of the rings 28 and 23, therefore making their outward deflection by the pressure of this material less likely. In addition some flow is possible by means of the branch conduit constituted by the chambers 31–35 so that the material will not solidify behind the rings 28 and 23. The material that exits past the valve screw 37 can be returned to the extruder and then to the passage 10.

Figure 23:
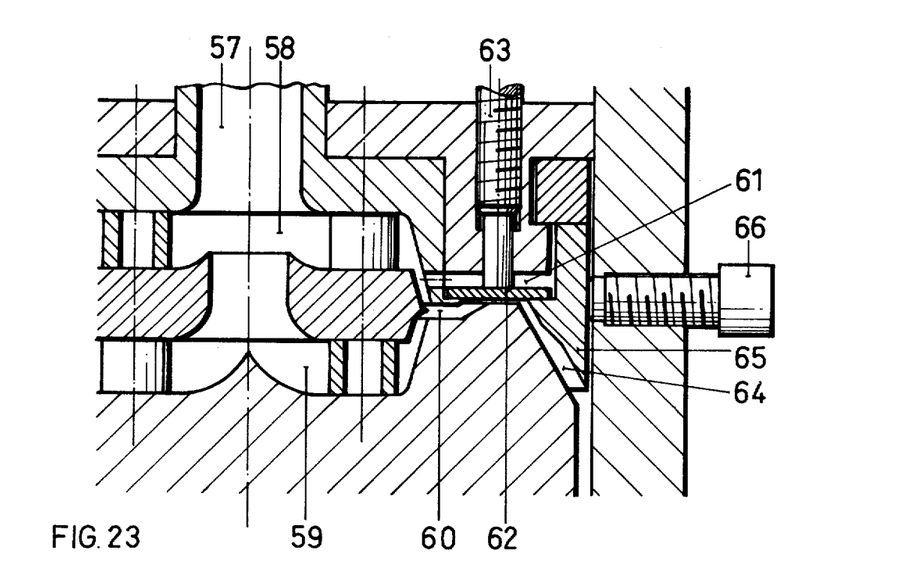
FIGS. 23, 24 and 25 are axial sections through eleventh, twelfth and thirteenth arrangements according to this invention.

It is also possible to replace the screws 24 of FIG. 8 with tension screws 37 as shown in FIG. 23 which are screwed into sleeves welded to the outer periphery of the sleeve 23 and which have heads that bear radially inwardly against the holder 26.

Figures 10, 12:
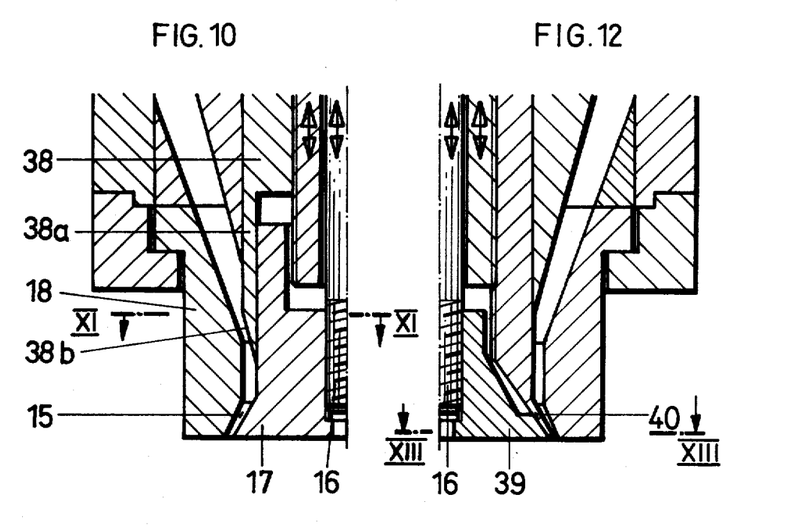
FIG. 10 is an axial section through a fourth embodiment of the shaping nozzle in accordance with this invention.
FIG. 12 is an axial section through a fifth embodiment of the nozzle according to this invention.
Figure 11:
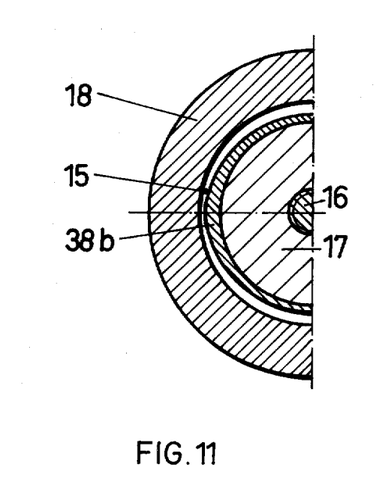
FIG. 11 is a section taken along the line XI—XI of FIG. 10.

FIGS. 10 and 11 show another arrangement wherein the adjustment element is carried on an axially displaceable piston or tube 38 and is formed as a collar 38a thereon having a profiled generally frustoconical surface 38b that defines a portion of the wall of the passage through the nozzle. As best shown in FIG. 11 this collar or extension 38a is not of regular thickness so that axial displacement of the element 38 will change the thickness and shape of the passage through the nozzle.

Figure 13:
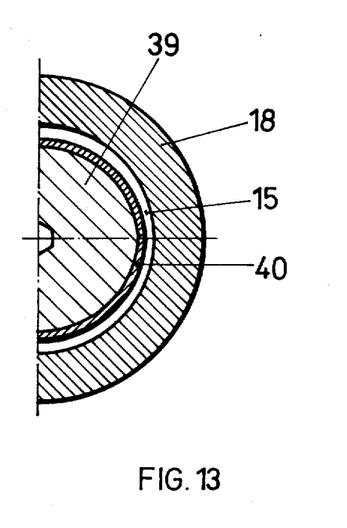
FIG. 13 is a section taken along line XIII—XIII of FIG. 12.

In FIG. 12 the member 40 forming part of the passage is itself not axially displaceable, but is radially deflectable and is engaged by a frustoconical surface of a member 39 carried on the rod 16. This frustoconical skirt can therefore be deformed into the shape shown in FIG. 13, which is identical to the shape of FIG. 11.

Figure 14:
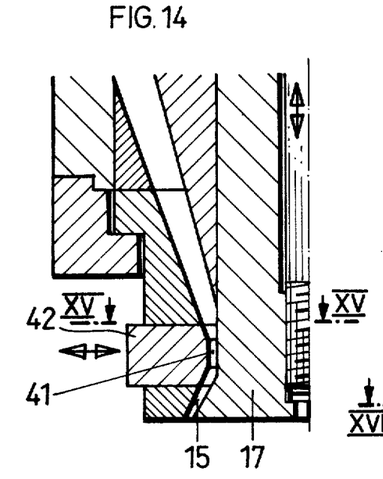
FIG. 14 is an axial section through a sixth embodiment of the apparatus according to this invention.
Figure 15:
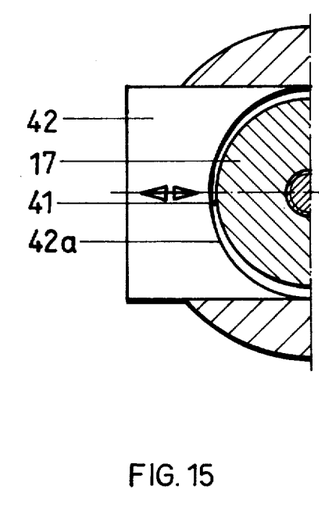
FIG. 15 is a section taken along line XV—XV of FIG. 14.

In FIGS. 14 and 15 the passage 15 is formed at region 41 by a radially displaceable eccentric element 42 having an inner periphery 42a of non-cylindrical shape or a shape at least not congruent to the core member 17.

Thus radial displacement of this eccentric element 42 by means of an assembly such as shown in FIG. 8 can adjust the shape of the passage at 41.

Figure 16:
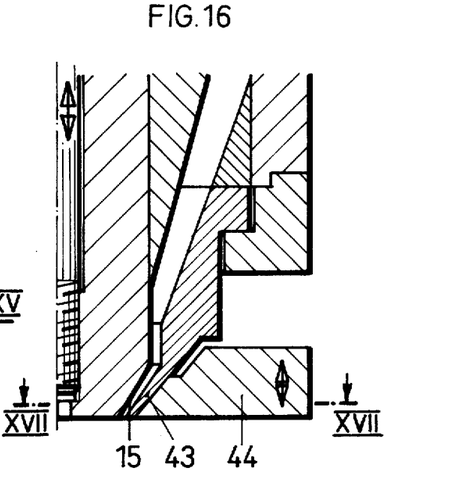
FIG. 16 is an axial section through a seventh embodiment of the nozzle in accordance with the instant invention.
Figure 17:
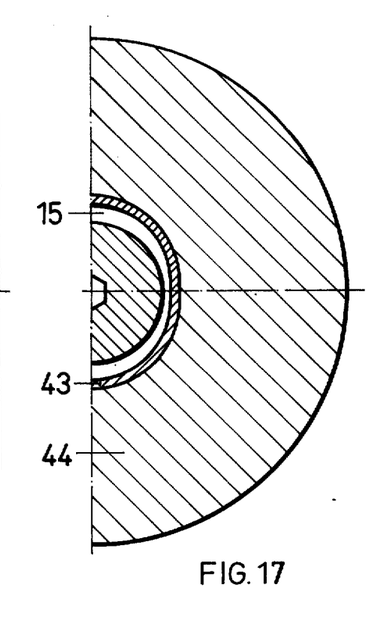
FIG. 17 is a section taken along line XVII—XVII of FIG. 16.

Another such arrangement is shown in FIGS. 16 and 17 wherein an outer disk member 44 has a frustoconical surface that bears on a radially inwardly deflectable skirt 43 at the outlet portion 15 of the passage through the nozzle. Thus axial displacement can deflect this skirt 43 inwardly and outwardly to change the shape of the passage at the outlet 15. The skirt 43 and the corresponding surface of the element 44 are of non-cylindrical shape.

Figures 18, 19, 20:
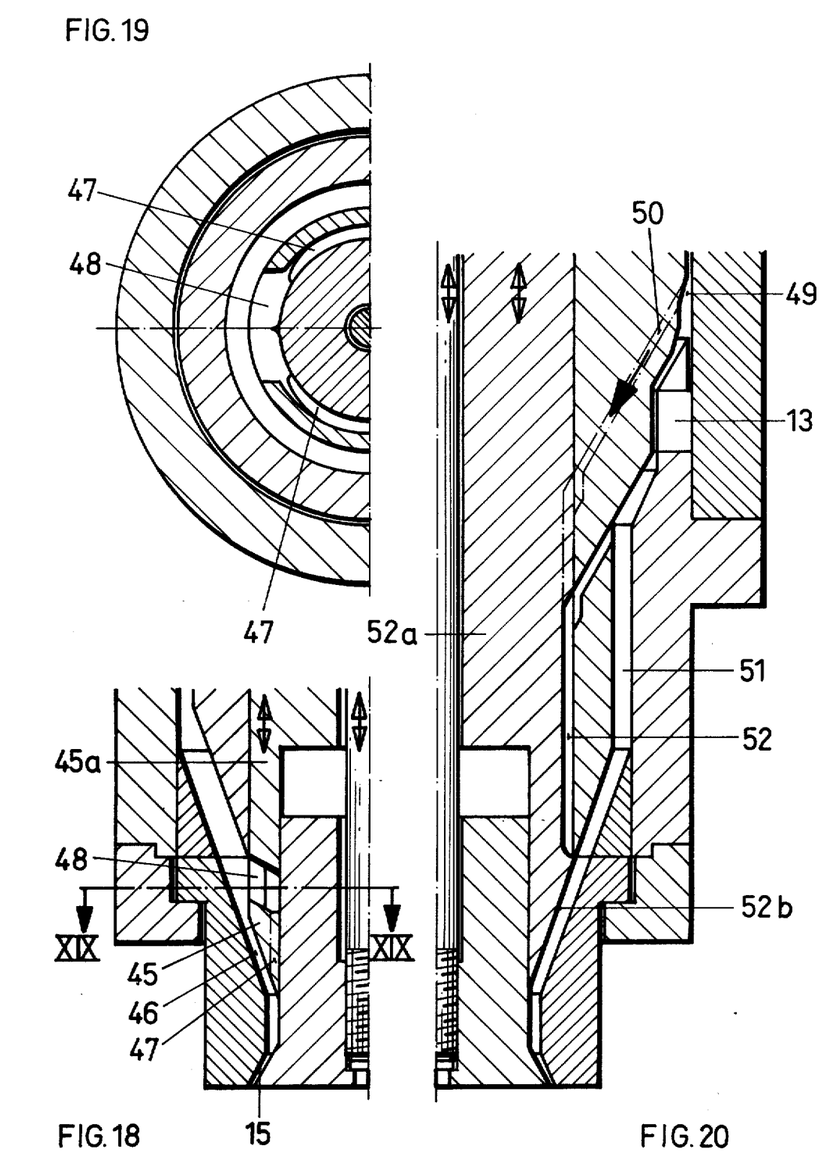
FIG. 18 is an axial section through an eighth embodiment of the nozzle according to this invention.
FIG. 19 is a section taken along line XIX—XIX of FIG. 18.
FIG. 20 is an axial section through a ninth embodiment of the arrangement according to this invention.

The arrangement of FIGS. 18 and 19 has a triangular-section ring 45 constituted as the lower end of an axially displaceable member 45a. This ring 45 has a surface that therefore forms a restricted portion 46 of the passage through the nozzle. In addition above the ring 45 the element 45a is formed with a throughgoing hole 48 that forms passages 47 behind the ring 45. Thus the pressure in the region 46 will not prevent sliding of the ring 45 on the core element.

In FIG. 20 a main distribution passage 49 communicates past the adjustment device 13 with a passage 51 and is provided with a branch passage 50, 52 which extends past this adjustment device 13. The two passages are united at their lower end above an axially displaceable surface 52b of an element 52a. Such axial or vertical displacement of the element 52a opens or closes the lower end of the passage 51 and therefore not only controls flow therefrom but can control the direction of displacement of the blank as it leaves the nozzle.

With the arrangements of FIGS. 19 and 20 it is possible relatively easily by axial displacement of the adjustment member to form thin and thick regions along the blank as it is extruded. Thus it is possible to thicken the blank and the region will form both the base and neck of a bottle or the like, otherwise maintaining the tubular blank relatively thin.

Figure 9:
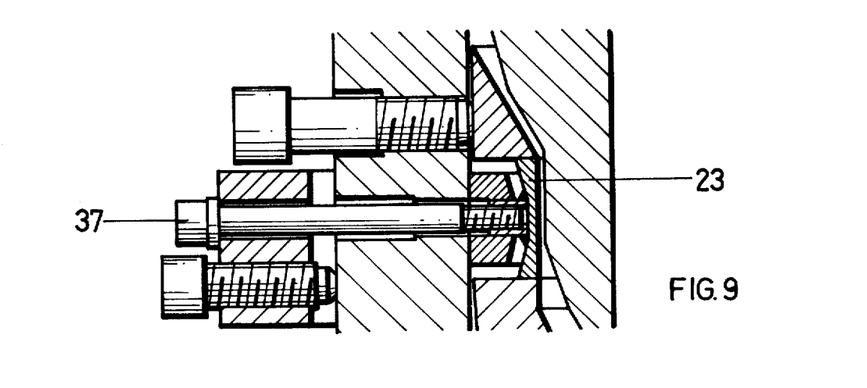
FIG. 9 is a large-scale sectional view through a variation on the third embodiment of FIG. 8.
Figure 22:
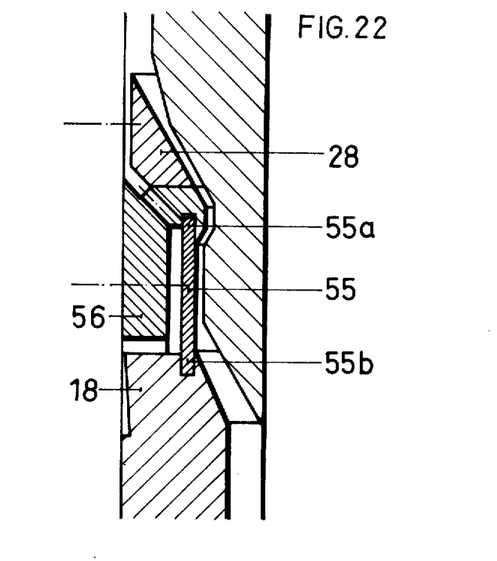
FIG. 22 is an axial section through a portion of a tenth nozzle in accordance with this invention.

The arrangement of FIG. 22 can be used in the systems of FIGS. 8 or 9. It has a highly elastically deformable adjustment ring 55 having an upper end 55a seated in the ring 28 and a lower end 55b seated in the fixed portion 18. A holder 56 can seat screws that serve to adjust it in the manner shown in FIG. 8 and in FIG. 9. This adjustment member 55 is completely cylindrical and is formed of steel. Obviously the chamber behind it may also be pressurized as shown in FIGS. 8 and 9 so that the pressure inside it does not deflect it outwardly.

The arrangement of FIG. 23 has an axial inlet 57 which communicates with axially offset distribution passages 58 and 59 that join at a passage 60 of relatively short axial width. Part of the wall of this passage 60 is defined by a disk 62 which can be displaced axially by means of a screw 63 and which lies underneath a counterpressure chamber 61 communicating with the passage 58. In addition a radially displaceable generally triangular-section ring 65 defines another portion 64 of the passage through the nozzle and in displaceable by means of a screw 66. The screws 63 and 66 are readily accessible from outside the machine and either of these screws can be replaced by a hydraulic or pneumatic cylinder controlled from a central computer or controller so as periodically to vary the radial or axial dimension of the passage at the respective location.

Figure 24:
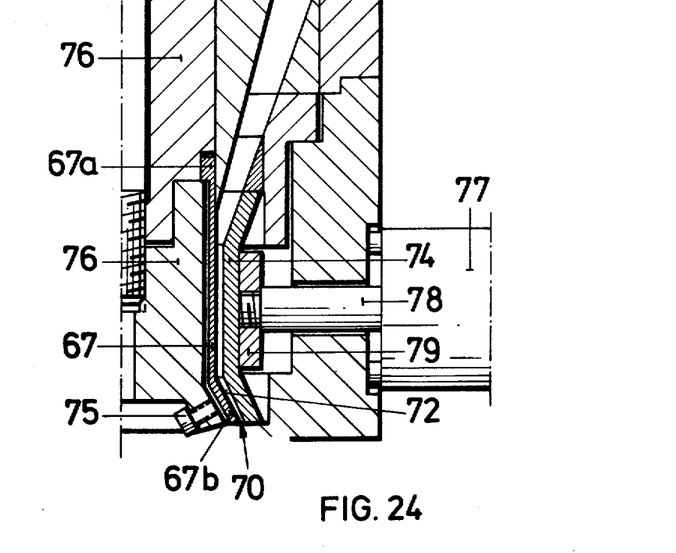

In FIG. 24 an inner ring 67 has an upper or upstream end 67a of rectangular section received in a corresponding groove in the core 76. Its downstream or lower end 67b is flared radially outwardly and is engaged by screws 75 projecting upwardly at an angle to the axis of the nozzle and perpendicular to the outwardly flared portion 67b. Thus it is possible by adjustment of any of the screws 75 to control the width of the passage 72 at the outlet 70.

Radially outside this inner adjustment ring 67 is an outer adjustment ring 74 that forms the outer wall of the passage and which is engaged at each of a plurality of segments by segmental pushers 79 each on the piston rod 78 of a small hydraulic cylinder 77. Each of these cylinders 77 is controlled by a master programmed controller which serves to control the thickness of the tubular blank produced by the shaping nozzle and exiting from the outlet 70 as it is produced.

Figure 25:
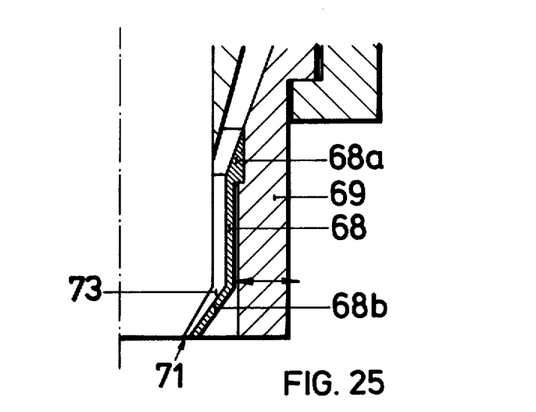

It is also possible to use only an outer sleeve or ring 68 as shown in FIG. 25 and having a triangular upper bead or end 68a received in a corresponding formation of the outer member 69. The lower end 68b is radially inwardly tapered and forms passage 73 terminating at the outlet 71. Means such as shown at 77 in FIG. 24 may be provided for radially deflecting this ring 68.

The thermoplastic synthetic-resin material that is shaped by the nozzle according to this invention is typically fed from an extruder in more or less homogeneous condition. When this hot homogeneous material is fed radially into the nozzle it must travel longer in some regions than in others so that it cools. Similarly when fed axially in some of the material is deflected around struts or webs which support the core of the nozzle so that once again the material will in part be cooler than in other parts. With the nozzle according to this invention it is possible to cancel out the effects of this variation in heating, which results in different consistencies and stretchabilities of the synthetic-resin material. Furthermore feeding the material in part through a branch conduit according to this invention further reduces irregularities from one portion to another.

Furthermore according to this invention it is possible to form articles adapted for a particular use with the most efficient possible use of synthetic-resin material. More particularly those regions of an article subjected to very little wear, or which need not be very strong, can be made relatively thin whereas other areas can be made much thicker. Furthermore such variation from one region to another can be not only angularly about the object being blow molded, but can be axially from one location to another on the article, the axis here of course being the axis along which the material is extruded.

It is noted in this context that any of the features of any of the embodiments can be applied to any of the other embodiments. Thus, for example, the adjustment cylinder of FIG. 24 could be used in the arrangements of FIGS. 8 or 9. Similarly the use of two sleeves such as shown in FIG. 24 could be applied to any of the other arrangements. All such combinations are considered to lie within the scope of the instant invention.

It will be understood that each of the elements described above, or two or more together, may also find a useful application in other types of molding systems differing from the types described above.

While the invention has been illustrated and described as embodied in a shaping system for blow molding, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A shaping nozzle for making a tubular synthetic resin blank for blow molding, said nozzle comprising a core member defining an axis; an outer member surrounding said core member and defining therewith an annular passage centered on said axis, having a predetermined generally uniform radial dimension and having an annular axial outlet opening; inlet means on one of said members connected to said passage for receiving a solid strand and converting same into a tubular strand in said passage; an adjustment element in said passage between said members and defining therein a region of variable radial dimensions different from said predetermined radial dimensions, said adjustment element being an axially elongated flexible ring; and a plurality of means for radially displacing individual portions of said flexible ring.

2. The nozzle defined in claim 1, wherein said ring is provided immediately adjacent said outlet.

3. The nozzle defined in claim 1, wherein said ring is provided spaced from said outlet and adjacent said inlet means.

4. The nozzle defined in claim 1, wherein said means for displacing is mounted on said outer member.

5. The nozzle defined in claim 4, wherein said means for displacing includes a plurality of screws secured to said outer member and engaged with said element.

6. The nozzle defined in claim 1, wherein said element has an inner periphery exposed in said passage and an outer periphery forming an annular compartment with said outer member, said nozzle being formed with a conduit extending between said passage and said compartment for pressurizing said compartment.

7. The nozzle defined in claim 6, wherein said nozzle is formed with a lateral bleed passage extending between said compartment and the exterior, whereby pressure in said compartment can be bled off through said bleed passage.

8. The nozzle defined in claim 7, and further comprising means for regulating the pressure in said compartment.

9. The nozzle defined in claim 1, wherein said means for displacing includes means for periodically displacing said elements and thereby periodically varying the thickness of said tubular strands at selected portions thereof.

10. The nozzle defined in claim 1, wherein said adjustment element has relative to the direction of flow of said strands to said nozzle a downstream end displaceable radially by said means for displacing.

* * * * *